United States Patent
Kubinski

(10) Patent No.: US 10,302,886 B2
(45) Date of Patent: May 28, 2019

(54) FIBER OPTIC SPLICE TRAY

(71) Applicant: Corning Research & Development Corporation, Corning, NY (US)

(72) Inventor: Nico Kubinski, Wuppertal (DE)

(73) Assignee: Corning Research & Development Corporation, Corning, NY (US)

( * ) Notice: Subject to any disclaimer, the term of this patent is extended or adjusted under 35 U.S.C. 154(b) by 0 days.

(21) Appl. No.: 16/058,371

(22) Filed: Aug. 8, 2018

(65) Prior Publication Data

US 2019/0086626 A1 Mar. 21, 2019

Related U.S. Application Data

(60) Provisional application No. 62/560,829, filed on Sep. 20, 2017.

(51) Int. Cl.
*G02B 6/44* (2006.01)

(52) U.S. Cl.
CPC ......... *G02B 6/4454* (2013.01); *G02B 6/4453* (2013.01)

(58) Field of Classification Search
None
See application file for complete search history.

(56) References Cited

U.S. PATENT DOCUMENTS

| | | | |
|---|---|---|---|
| 5,619,608 A | | 4/1997 | Foss et al. |
| 5,647,045 A | * | 7/1997 | Robinson ............. G02B 6/4454 385/135 |
| 5,796,908 A | * | 8/1998 | Vicory ................. G02B 6/4454 385/135 |
| 6,112,006 A | | 8/2000 | Foss |
| 6,144,792 A | * | 11/2000 | Kim .................... H01S 3/06704 385/134 |
| 6,215,938 B1 | * | 4/2001 | Reitmeier ........... G02B 6/4441 385/134 |

(Continued)

FOREIGN PATENT DOCUMENTS

| | | | |
|---|---|---|---|
| EP | 1333303 A1 | * | 8/2003 |
| GB | 2286060 A | * | 8/1995 |
| WO | 2009048795 A1 | | 4/2009 |

OTHER PUBLICATIONS

International Search Report and Written Opinion of the International Searching Authority; PCT/US2018/045766; dated Oct. 22, 2018; 14 Pages; European Patent Office.

*Primary Examiner* — Michael Stahl
(74) *Attorney, Agent, or Firm* — Tamika A. Crawl-Bey

(57) ABSTRACT

An optical fiber splice tray is described that has a base, a fiber management region, a first splicing zone on a first side of the fiber management region and separated from the fiber management region by a first containment wall, a second splicing zone on a second side of the fiber management region and separated from the fiber management region by a second containment wall, the second side opposite the first side, at least one first optical component location disposed adjacent to the first splicing zone opposite the fiber management region, the first splicing zone between the at least one first optical component location and the fiber management region, and at least one second optical component location disposed adjacent to the second splicing zone, the second splicing zone between the at least one second optical component location and the fiber management region.

20 Claims, 2 Drawing Sheets

(56) References Cited

U.S. PATENT DOCUMENTS

| | | | | |
|---|---|---|---|---|
| 6,343,761 B1* | 2/2002 | Talamini, Sr. | ....... | G02B 6/4457 |
| | | | | 242/388 |
| 6,504,989 B1* | 1/2003 | Gooding | ............. | G02B 6/4454 |
| | | | | 385/135 |
| 2009/0290842 A1* | 11/2009 | Bran de Leon | ...... | G02B 6/4455 |
| | | | | 385/135 |
| 2010/0183274 A1* | 7/2010 | Brunet | ................ | G02B 6/4452 |
| | | | | 385/135 |
| 2014/0193129 A1* | 7/2014 | Bryon | .................. | G02B 6/4469 |
| | | | | 385/135 |
| 2015/0205064 A1* | 7/2015 | Claessens | ............ | G02B 6/4453 |
| | | | | 385/135 |

\* cited by examiner

FIBER OPTIC SPLICE TRAY

CROSS-REFERENCE TO RELATED APPLICATIONS

This application claims the benefit of priority to U.S. Provisional Patent Application Ser. No. 62/560,829 filed on Sep. 20, 2017, the content of which is relied upon and incorporated herein by reference in its entirety.

BACKGROUND OF THE INVENTION

Field of the Invention

The present invention is directed to a high-density fiber optic splice tray.

Background

Telecommunication cables are used for distributing all manner of data across vast networks. A telecommunication cable typically includes a bundle of individual telecommunication lines (either optical fibers or copper wires) that are encased within a protective sheath. As telecommunication cables are routed across data networks, it is necessary to periodically open the cable so that one or more telecommunication lines therein may be spliced, thereby allowing data to be distributed to other cables or "branches" of the telecommunication network. The cable branches may be further distributed until the network reaches individual homes, businesses, offices, premises, and so on.

At each point where a telecommunication cable is opened, some type of enclosure is provided to protect the exposed interior of the cable. Commonly, the enclosure has one or more ports through which cables enter and/or exit the enclosure. Once inside the enclosure, the cable is opened to expose the telecommunication lines therein. Conventional telecommunication enclosures are constructed to facilitate the management and protection of individual telecommunication lines and splices thereof.

Frequently, these telecommunication enclosures include fiber optic splice trays to interconnect a plurality of optical fibers. With increasing bandwidth demands, telecommunication companies are seeking new ways to increase connection densities within their existing infrastructure. However, space is frequently at a premium. Thus, there is a need for new more dense and compact components for use in telecommunication enclosures.

SUMMARY

An optical fiber splice tray is described that has a base having an external perimeter, a fiber management region within the external perimeter of the base, a first splicing zone on a first side of the fiber management region and separated from the fiber management region by a first containment wall extending from the base, a second splicing zone on a second side of the fiber management region and separated from the fiber management region by a second containment wall extending from the base, the second side opposite the first side, at least one first optical component location disposed adjacent to the first splicing zone opposite the fiber management region, the first splicing zone between the at least one first optical component location and the fiber management region, and at least one second optical component location disposed adjacent to the second splicing zone, the second splicing zone between the at least one second optical component location and the fiber management region.

Optical components which can be held in the optical component locations include optical fiber splitters, wavelength-division multiplexing (WDM) devices, fanout devices or multifiber splice devices. In one exemplary embodiment, the at least one optical component location adjacent to each splicing zone is a splitter location for holding one of an optical fiber splitter and a WDM device. In an alternative embodiment, each of the least one optical component location can further include an optical component holder that is configured to hold one of a fanout device and a multifiber splice. In a different embodiment, each of the optical component locations can be configured for two optical fiber splitters.

The exemplary fiber optic splice trays are compact, having an overall thickness between about 4 mm and about 8 mm and an internal volume of between about 2.3 $in^3$ and about 3.0 $in^3$ and providing for a single fiber splice density of at least 5 single splices/$in^3$.

The above summary of the present invention is not intended to describe each illustrated embodiment or every implementation of the present invention. The figures and the detailed description that follows more particularly exemplify these embodiments.

BRIEF DESCRIPTION OF THE DRAWINGS

The present invention will be further described with reference to the accompanying drawings, wherein.

Figure 1A:
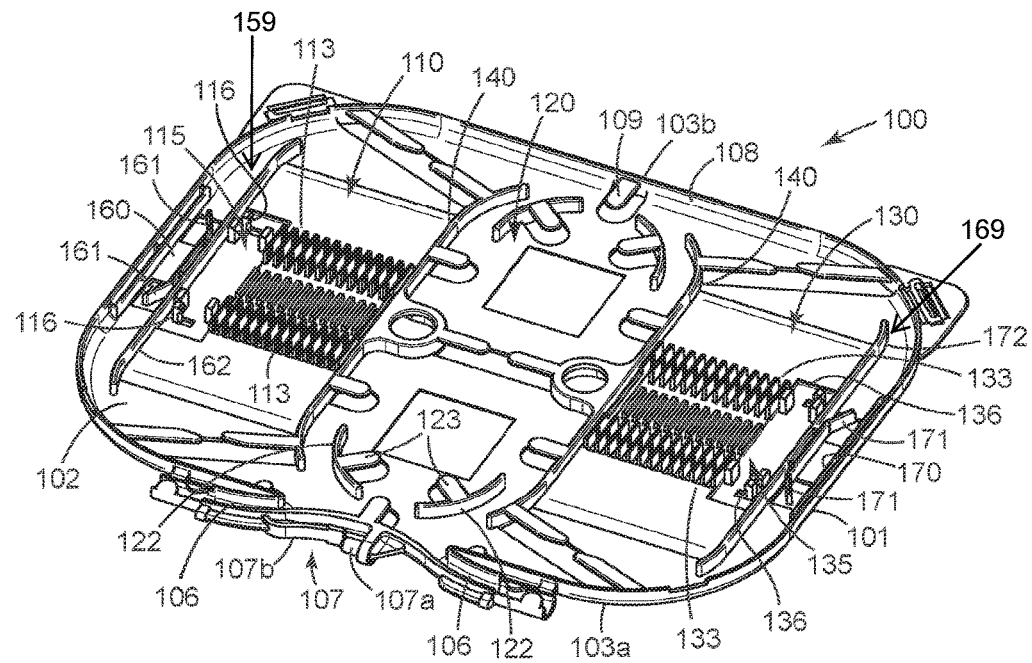
FIGS. 1A and 1B are two views of an exemplary high-density fiber optic splice tray according to an embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF THE EMBODIMENTS

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "forward," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1B:
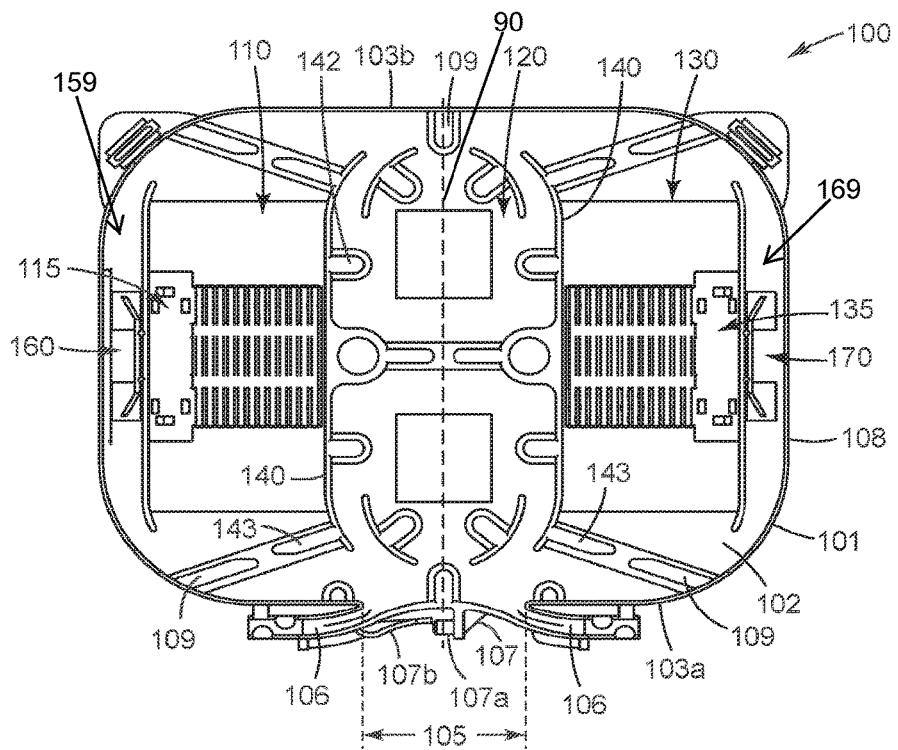

Referring to FIGS. 1A and 1B, splice tray 100 (may also be referred to herein as a tray, fiber optic splice tray, etc.) has a tray body 101 comprising a generally rectangular base 102 extending longitudinally from a first end 103a to a second end 103b, wherein the base 102 includes a cable entrance region 105 at the first end 103a of the splice tray 100 and a side wall 108 extending from the base 102 from a first edge of the cable entrance region 105 on one side, around the external perimeter of the base 102, to a second opposite edge of the cable entrance region 105. In other words, the splice tray 100 includes a sidewall 108 extending from the base 102 at least partially around the external perimeter of the base 102, where the sidewall 108 defines a cable entrance region 105. The sidewall 108 can have a plurality of first tabs 109 extending from the top edge of the sidewall 108 toward the interior of the splice tray 100 to control the vertical positioning of the optical fibers within the splice tray 100.

Splice tray 100 has first and second splicing zones 110, 130 disposed on either side of a fiber management region 120. In other words the splice tray 100 includes a fiber management region 120 within an external perimeter of the base 102. Each of each of the splicing zones 110 is separated from the fiber management region 120 by containment walls 140 extending from the base 102 of the splice tray 100. The containment walls 140 are configured to separate the fiber management region 120 from the splicing zones 110, 130 as well as to help guide and manage the bend radius of the optical fibers being routed within the splice tray 100. In particular, the containment walls 140 are configured to route optical fibers within the fiber management region 120 of the splice tray 100. In other words, the splice tray 100 includes a first splicing zone 110 on a first side of the fiber management region 120 and separated from the fiber management region 120 by a first containment wall 140 extending from the base 102, and a second splicing zone 130 on a second side of the fiber management region 120 and separated from the fiber management region 120 by a second containment wall 140 extending from the base, the second side opposite the first side.

The containment walls 140 can have a number of second tabs 142 extending from the top edge of the containment walls 140 toward the fiber management region 120 to control the vertical positioning of the optical fibers within the splice tray 100 and a number of fourth tabs 143 extending from the top edge of the containment walls 140 in a direction opposite second tabs 142 that extend toward the free ends of the first tabs 109 to manage the optical fibers (not shown) entering and leaving the first and second splicing zones 110, 130.

The fiber management region 120 can be generally elliptical or oval shaped as defined by bend control walls 122. The bend control walls 122 can have a plurality of third tabs 123 extending from the top edge of the bend control walls 122 toward the center of the fiber management region 120 of the splice tray 100 to control the vertical positioning of the optical fibers within the fiber management region 120. In other words, the splice tray 100 includes a plurality of bend control walls 122 defining a generally elliptical shape of the fiber management region 120. The bend control walls 122 are configured to prevent exceeding a minimum bend radius of optical fibers routed within the splice tray 100.

The combination of the sidewall 108, the containment walls 140 and the bend control walls 122 provide an orderly means of routing and managing a plurality of optical fibers, in particular 250 micron-coated optical fibers, in a small space. The area bounded by bend control walls 122 can be used to store up to a meter length of the 250 micron-coated optical fibers being connected within the tray. The space between the bend control walls 122 and the containment walls 140 provides an orderly means of managing optical fibers being routed from the fiber management region 120 (may also be referred to herein as a storage area) to one of the splicing zones 110, 130, and the sidewall 108 ensures that all of the optical fibers being connected in the splice tray 100 stay in the splice tray 100.

The first and second splicing zones 110, 130 include a plurality of catch walls 113, 133 in the first and second splicing zones 110, 130, respectively, that are configured to hold a plurality of single fiber optical fiber splices (not shown). In an exemplary aspect, the single fiber optical fiber splices can be single fiber fusion splices single fiber mechanical splices such as a Fibrlok™ Mechanical Splice available from 3M Company (St. Paul, Minn.).

Splice tray 100 also includes at least one optical component location disposed adjacent to each of the first and second splicing zone 159, 169 on a side opposite the fiber management region 120 that can be configured to hold an optical fiber splitter, a wavelength-division multiplexing (WDM) device, a fanout device, or a multifiber splice.

In the exemplary embodiment shown in FIGS. 1A and 1B, each of at least one optical component location 159, 169 can include a splitter location 160, 170 disposed on either side of the first and second splicing zone 110, 130 on a side opposite the fiber management region 120, such that splice tray 100 includes a first splitter location 160 disposed between the first splicing 110 zone and side wall 108 and a second splitter location 170 disposed between the second splicing 110 zone and sidewall 108 opposite the first splitter location 160. In other words, each of the at least one first optical component location 159 and the at least one second optical component location 169 includes at least one splitter location 160, 170 for holding at least one of an optical fiber splitter and a WDM device. In certain embodiments, the first splitter location 160 and the second splitter location 170 include two splitter locations (see FIGS. 2A and 2B). Optical splitters can be held in place in the splitter location 160, 170 by flexible arms 161, 171 of each splitter location 160, 170. The flexible arms 161, 171 are positioned with an angle relative to a support wall 162, 172 disposed between the splitter location 160, 170 and the adjacent splicing zone 110, 130. When an optical splitter is introduced in the space (splitter location 160, 170) between the flexible arms 161, 171 and sidewall 108, the optical splitter is held against the sidewall 108 by the flexible arms 161, 171.

In certain embodiments, the at least one optical component location 159, 169 can also include an optical component holder 115, 135 that is configured to hold one of a multifiber splice device (not shown) or an optical fanout device (not shown). In other words, in certain embodiments, each of the at least one first optical component location 159 and the at least one second optical component location 169 includes an optical component holder 115, 135 that is configured to hold one of a multifiber splice device or an optical fanout device. The optical component holder 115, 135 includes a plurality of latch arms 116, 136 extending from the base 102 of the splice tray 100 to retain an optical component adjacent to one or both of the first and second splicing zones 110, 130. In an alternative aspect, optical component holder 115, 135 can be considered an additional optical component location disposed in each of the splice zones 110, 130 and their associated splitter location 160, 170.

The entrance region 105 of splice tray 100 includes a pair of fiber entrance/exit channels 106 extending from entrance region 105 in a slightly curved configuration to prevent potential kinks or unintended bends being placed on the entering/exiting fibers that are received by the splice tray 100. In other words, the splice tray 100 includes a pair of curved fiber channels 106 extending from the entrance region 105. In an exemplary aspect, the entrance region 105 may also include a latching mechanism 107 that is configured to attach the splice tray 100 to a tray organizer in a rotational manner. In one embodiment, latching mechanism 107 can comprise a latch post 107a and a coupling member 107b that can be depressed to allow the splice tray 100 to be assembled to a tray organizer. Releasing the coupling member 107b locks the splice tray 100 to the tray organizer while still allowing the splice tray 100 to rotate with respect to the tray organizer.

The fiber entrance/exit channels 106 provide continual support to the entering/exiting optical fibers as the splice tray 100 is being rotated forward and backward when the splice tray 100 is secured on splice tray organizer (not shown). In a preferred aspect, the channels 106 are formed having a (relatively) deep "U" shape in cross-section, which supports and holds fiber disposed therein even when the splice tray 100 is fully tilted in either direction.

Figure 2A:
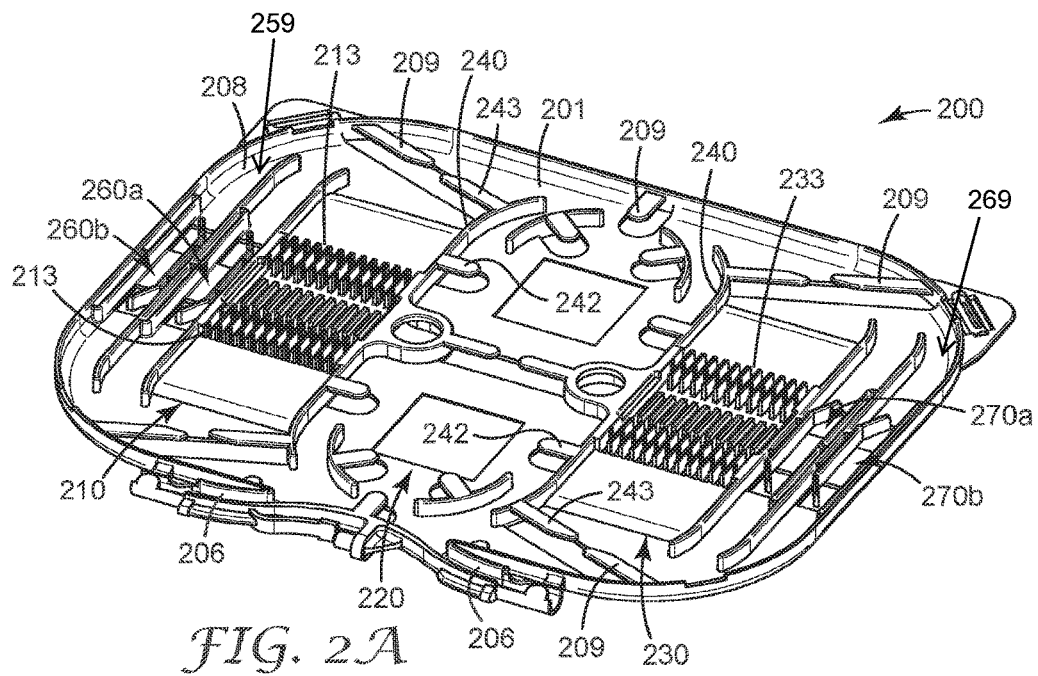
FIGS. 2A and 2B are two views of an alternative exemplary high-density fiber optic splice tray according to an embodiment of the present invention.
Figure 2B:
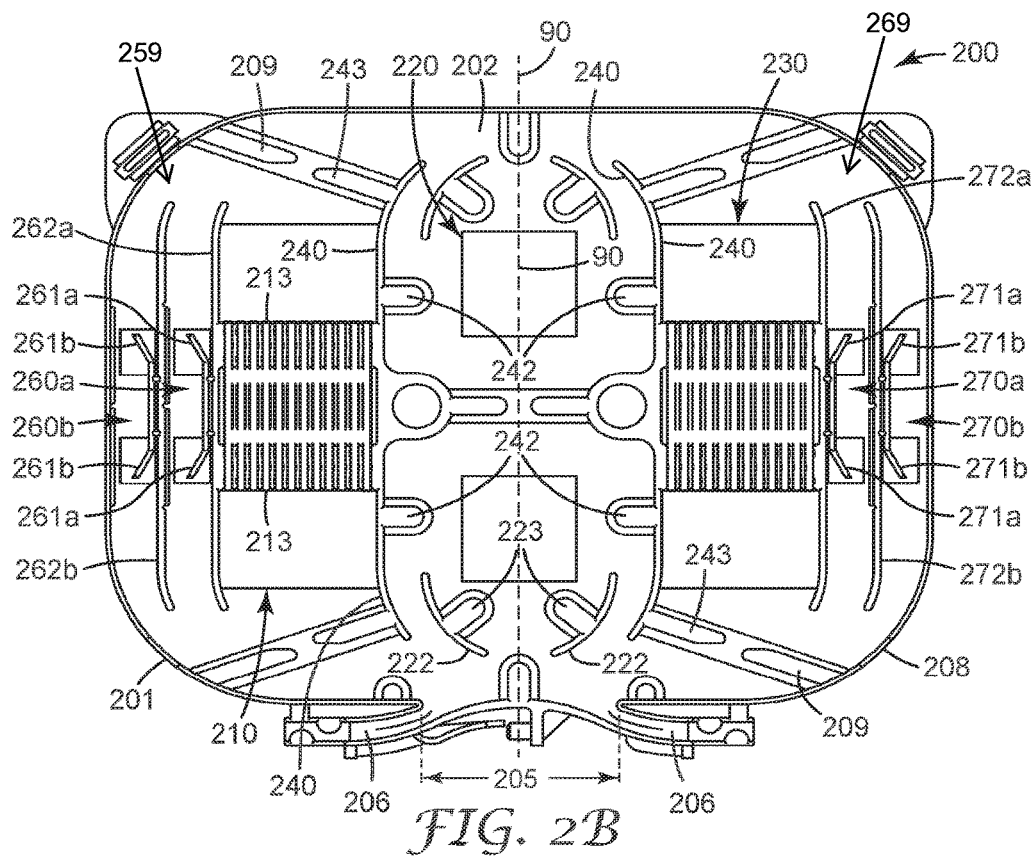

In an exemplary second embodiment as shown in FIGS. 2A and 2B, splice tray 200 is shown. Splice tray 200 includes similar components and functionality as provided and described above with respect to the splice tray 100 of FIGS. 1A and 1B, except where otherwise noted. Splice tray 200 includes a tray body 201 comprising a generally rectangular base 202 that includes a cable entrance region 205 at the first end of the splice tray 200 and a side wall 208 extending from the base 202 from a first edge of the cable entrance region 205 on one side, around the external perimeter of the base 202, to a second opposite edge of the cable entrance region 205. In other words, the splice tray 200 includes a sidewall 208 extending from the base 202 at least partially around the external perimeter of the base 202, where the sidewall 208 defines a cable entrance region 205. The sidewall 208 can have a plurality of second tabs 209 extending from the top edge of the sidewall 208 toward the interior of the splice tray 200 to control the vertical positioning of the optical fibers within the splice tray 200.

Splice tray 200 has first and second splicing zones 210, 230 disposed on either side of a fiber management region 220. In other words, the splice tray 200 includes a fiber management region 220 within an external perimeter of the base 202. Each of the splicing zones 210, 230 is separated from the fiber management region 220 by a containment wall 240 extending from the base 202 of the splice tray 200. The containment walls 240 are configured to separate the fiber management region 220 from the splicing zone 210, 230 as well as to help guide and manage the bend radius of the optical fibers being routed within the splice tray 200. In other words, the splice tray 200 includes a first splicing zone 210 on a first side of the fiber management region 220 and separated from the fiber management region 220 by a first containment wall 240 extending from the base 202, and a second splicing zone 230 on a second side of the fiber management region 220 and separated from the fiber management region 220 by a second containment wall 240 extending from the base, the second side opposite the first side. The containment walls 240 are configured to route optical fibers within the fiber management region 220 of the splice tray 200.

The containment walls 240 can have some number of second tabs 242 extending from the top edge of the containment walls 240 toward the fiber management region 220 to control the vertical positioning of the optical fibers within the splice tray 200, and a number of fourth tabs 243 extending from the top edge of the containment walls 240 in a direction opposite second tabs 242 that extent toward the free ends of first tabs 209 to manage the optical fibers (not shown) entering and leaving the first and second splicing zones 210, 230.

As with the splice tray 100 of FIGS. 1A and 1B, fiber management region 220 can be generally elliptical or oval shaped as defined by bend control walls 222. The bend control walls 222 can have some number of third tabs 223 extending from the top edge of the bend control walls 222 toward the center of the fiber management region 220 of the splice tray 200 to control the vertical positioning of the optical fibers within the fiber management region 220.

The combination of the sidewall 208, the containment walls 240, and the bend control walls 222 provides an orderly means of routing and managing a plurality of optical fibers, in particular 250-micron coated optical fibers in a small space, as described previously. The first and second splicing zones 210, 230 include a plurality of catch walls 213, 233 in the first and second splicing zones 210, 230, respectively, that are configured to hold a plurality of single fiber optical fiber splices (not shown). Splice tray 200 also includes at least one optical component location 259, 269 disposed adjacent to each of the first and second splicing zone 210, 230 on a side opposite the fiber management region 220.

The primary difference between splice tray 100 and splice tray 200 is that splice tray 200 includes four splitter locations 260a,b and 270a,b. Two splitter locations 260a, 260b are disposed adjacent to the first splicing zone 210 on a side opposite the fiber management region 220, and two splitter locations 270a, 270b are disposed adjacent to the second splicing zone 230 on a side opposite the fiber management region 220. In the exemplary embodiment shown in FIGS. 2A and 2B, tray 200 includes a pair of first splitter locations 260a, 260b disposed between the first splicing zone 210 and side wall 208 and a second pair of splitter locations 270a, 270b disposed between the second splicing 230 zone and sidewall 208 opposite the first splitter locations 260a, 260b. The optical splitters can be held in place in the splitter locations 260a, 260b, 270a, 270b by flexible arms 261a, 261b, 271a, 271b of each splitter location 260a, 260b, 270a, 270b, respectively and a support wall 262a, 262b. 272a, 272b or the sidewall 208.

Flexible arms 261a of splitter location 260a are positioned at an angle relative to a support wall 262a disposed between splitter location 260a and the adjacent first splicing zone 210 and extend toward the support wall 262b. The flexible arms 261a form a spring clip to hold a splitter or other optoelectronic component or device between the flexible arms 261a and the support wall 262b. Similarly, flexible arms 261b of splitter location 260b are positioned at an angle relative to a support wall 262b disposed between splitter locations 260a, 260b, and extending toward sidewall 201 such that the flexible arms 261b can hold a splitter or other optoelectronic device between the flexible arms 261b and the sidewall 201. Splice tray 200 is biaxially symmetric such that the left side of the splice tray 200 is essentially a mirror image of the right side of the splice tray 200. Thus, flexible arms 271a of splitter location 270a are positioned at an angle relative to a support wall 272a disposed between splitter location 270a and the second splicing zone 230. The free ends of the flexible arms 271a extend toward support wall 272b forming a spring clip to hold a splitter or other optoelectronic component or device between the flexible arms 271a and support wall 272b. Similarly, flexible arms 271b of splitter location 260b are positioned at an angle relative to a support wall 272b disposed between splitter locations 270a, 270b, and extend toward sidewall 201 such that the flexible arms 271b can hold a splitter or other optoelectronic component or device between the flexible arms 271b and the sidewall 201.

The entrance region 205 of splice tray 200 is analogous to entrance region 105 of splice tray 100 and as such does not need to be repeated here.

The exemplary tray 100, 200 of the present disclosure can hold between 12 and 24 single fiber splices, preferably between 16 and 24 single fiber splices, depending on the size of the single fiber splices being held and the number and type of additional optical components. In the embodiments shown, the exemplary tray 100, 200 can hold up to 4 passive or active optical components. In one embodiment, the optical component is an optical fiber splitter. For example, the exemplary trays described herein can hold 2—1×8 splitters, 4—1×4 splitters, or 2—1×16 splitter. Other combinations are possible depending on the tray configuration and should be considered part of the present invention. Splice trays 100, 200 are biaxially symmetric along a centerline 90 (see, e.g., FIG. 2B) of the tray 200 that extends between fiber entrance/exit channels 106, 206 through the center of the fiber management region 120, 220 such that the first fiber splicing zone 110, 210 is disposed on one side of the centerline 90 and the second splicing zone 130, 230 is disposed on the opposite side of the centerline 90.

In an exemplary aspect, each of the first and second splicing zones 110, 130, 210, 230 can be configured to hold between 8 and 12 single fiber splices. Thus, the total splice capacity for the exemplary splice trays 100, 200 can be between 16 and 24 single fiber splices.

The exemplary splice trays can be relatively thin compared to many conventional splice trays. In an exemplary embodiment, the exemplary trays 100, 200 can have a thickness of between 0.16 in (0.4 cm) and about 0.28 in (0.7 cm), preferably about 0.2 in (0.51 cm) in depth and can have an internal volume of between about 2.3 $in^3$ (38 $cm^3$) and about 3.0 $in^3$ (50 $cm^3$), preferably about 2.7 $in^3$ (38 $cm^3$). In certain embodiments, the splice tray 100 has a thickness of between 4 mm and 8 mm, and preferably about 5 mm. Alternatively, the present invention provides fiber optic splice trays 100, 200 having a defined connection density of splice holders per unit of volume of the splice tray of at least 5 single splices/$in^3$, preferably at least 7 single splices/$in^3$, and more preferably at least 9 single splices/$in^3$, in addition to providing capacity for at least two optical components such as optical fiber splices, multifiber splices or WDWM devices.

Although the term "splice tray" is used throughout this disclosure, in alternative aspects, the trays described herein can hold passive and/or active optical components, as well as splices.

Various modifications, equivalent processes, as well as numerous structures to which the present invention may be applicable will be readily apparent to those of skill in the art to which the present invention is directed upon review of the present specification.

What is claimed is:

1. An optical fiber splice tray comprising:
   a base having an external perimeter;
   a fiber management region within the external perimeter of the base;
   a first splicing zone on a first side of the fiber management region and separated from the fiber management region by a first containment wall extending from the base;
   a second splicing zone on a second side of the fiber management region and separated from the fiber management region by a second containment wall extending from the base, the second side opposite the first side;
   at least one first optical component location disposed adjacent to the first splicing zone opposite the fiber management region, the first splicing zone between the at least one first optical component location and the fiber management region; and
   at least one second optical component location disposed adjacent to the second splicing zone, the second splicing zone between the at least one second optical component location and the fiber management region;
   wherein the optical fiber splice tray is configured to provide a connection density of at least 5 single splices/$in^3$.

2. The optical fiber splice tray of claim 1, further comprising a sidewall extending from the base at least partially around the external perimeter of the base, the sidewall defining a cable entrance region.

3. The optical fiber splice tray of claim 2, further comprising a pair of curved fiber channels extending from the entrance region.

4. The optical fiber splice tray of claim 3, wherein the optical fiber splice tray is biaxially symmetric along a centerline extending between the fiber channels through the center of the fiber management region such that the first fiber splicing zone is disposed on one side of the centerline and the second splicing zone is on an opposite side of the centerline.

5. The optical fiber splice tray of claim 1, wherein each of the at least one first optical component location and the at least one second optical component location is configured to hold at least one of an optical fiber splitter, a wavelength-division multiplexing (WDM) device, a fanout device, and a multifiber splice.

6. The optical fiber splice tray of claim 1, wherein each of the at least one first optical component location and the at least one second optical component location comprises at least one splitter location for holding at least one of an optical fiber splitter and a WDM device.

7. The optical fiber splice tray of claim 6, wherein the at least one splitter location comprises two splitter locations.

8. The optical fiber splice tray of claim 6, wherein each of the at least one first optical component location and the at least one second optical component location further comprises an optical component holder configured to hold at least one of a fanout device and a multifiber splice.

9. The optical fiber splice tray of claim 1, wherein the first containment wall and the second containment wall are configured to route optical fibers within the fiber management region of the optical fiber splice tray.

10. The optical fiber splice tray of claim 1, further comprising a plurality of bend control walls defining a generally elliptical shape of the fiber management region, the bend control walls configured to prevent exceeding a minimum bend radius of optical fibers routed within the optical fiber splice tray.

11. The optical fiber splice tray of claim 1, wherein the optical fiber splice tray has a thickness of between 4 mm and about 8 mm.

12. The optical fiber splice tray of claim 11, wherein the thickness of the optical fiber splice tray is about 5 mm.

13. The optical fiber splice tray of claim 1, wherein the optical fiber splice tray has an internal volume of between about 2.3 in$^3$ and about 3.0 in$^3$.

14. The optical fiber splice tray of claim 1, wherein the optical fiber splice tray has an internal volume of about 2.7 in$^3$.

15. The optical fiber splice tray of claim 1, wherein the optical fiber splice tray is configured to provide a splice connection density of at least 7 single splices/in$^3$.

16. The optical fiber splice tray of claim 1, wherein the optical fiber splice tray is configured to provide a splice connection density of at least 9 single splices/in$^3$.

17. The optical fiber splice tray of claim 1, wherein each of the first splicing zone and the second splicing zone comprises a plurality of catch walls configured to hold a plurality of single fiber optical fiber splices.

18. The optical fiber splice tray of claim 1, wherein each of the at least one first optical component location and the at least one second optical component location comprises at least one splitter location comprising flexible arms to hold an optical splitter against a sidewall extending from the base at least partially around the external perimeter of the base.

19. The optical fiber splice tray of claim 8, wherein the optical component holder comprises a plurality of latch arms extending from the base of the splice tray.

20. An optical fiber splice tray comprising:
a base having an external perimeter;
a fiber management region within the external perimeter of the base;
a first splicing zone on a first side of the fiber management region and separated from the fiber management region by a first containment wall extending from the base;
a second splicing zone on a second side of the fiber management region and separated from the fiber management region by a second containment wall extending from the base, the second side opposite the first side;
at least one first optical component location disposed adjacent to the first splicing zone opposite the fiber management region, the first splicing zone between the at least one first optical component location and the fiber management region;
at least one second optical component location disposed adjacent to the second splicing zone, the second splicing zone between the at least one second optical component location and the fiber management region;
a sidewall extending from the base at least partially around the external perimeter of the base, the sidewall defining a cable entrance region; and
a pair of curved fiber channels extending from the entrance region;
wherein the optical fiber splice tray is biaxially symmetric along a centerline extending between the fiber channels through the center of the fiber management region such that the first fiber splicing zone is disposed on one side of the centerline and the second splicing zone is on an opposite side of the centerline.

\* \* \* \* \*